UNITED STATES PATENT OFFICE.

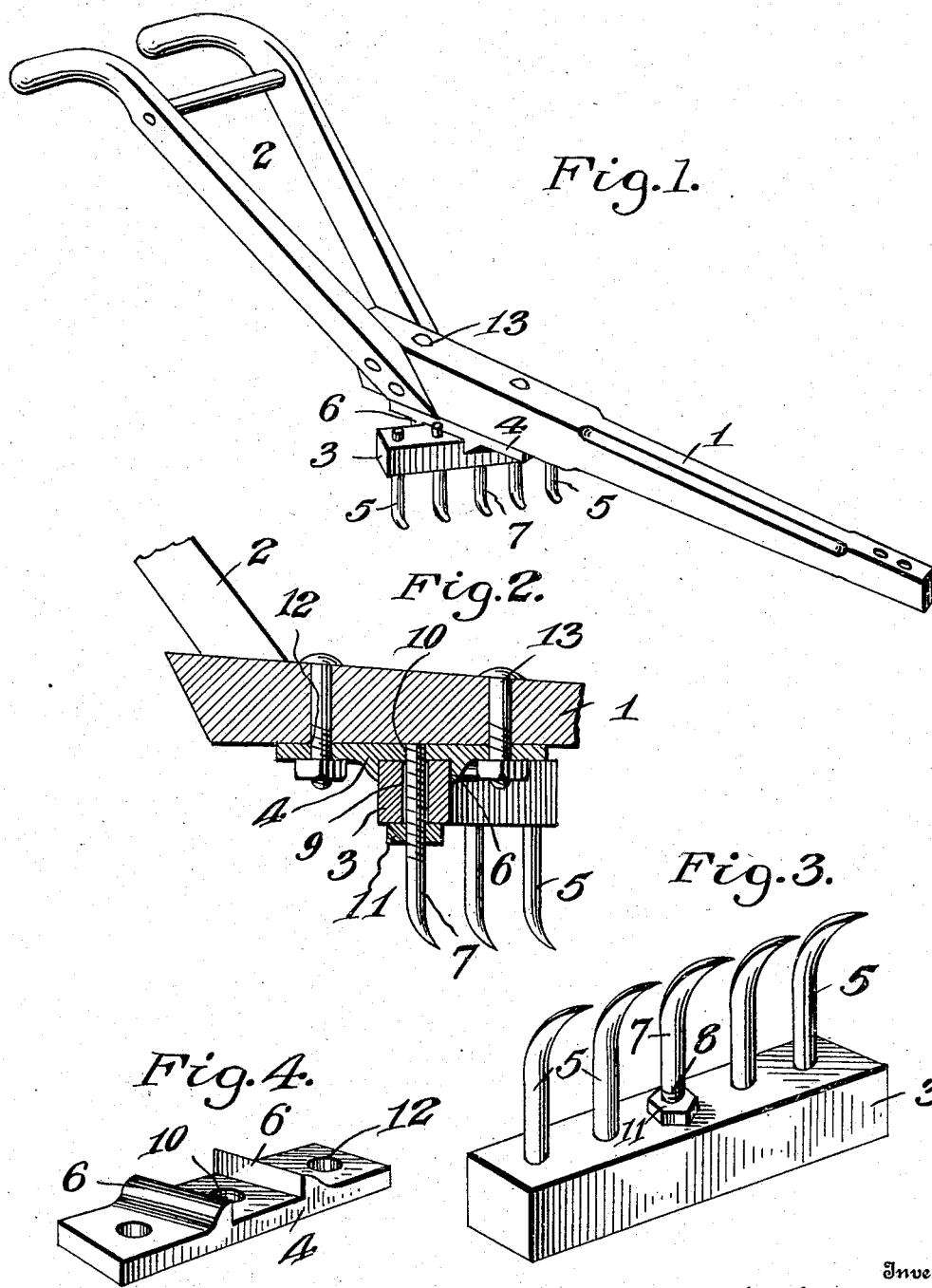

WILLIAM W. ROSS AND HARRY L. ROSS, OF SMYRNA, TENNESSEE.

COTTON-CULTIVATOR.

937,470.     Specification of Letters Patent.     Patented Oct. 19, 1909.

Application filed June 18, 1909. Serial No. 502,988.

*To all whom it may concern:*

Be it known that we, WILLIAM W. Ross and HARRY L. Ross, citizens of the United States, residing at Smyrna, in the county of Rutherford and State of Tennessee, have invented certain new and useful Improvements in Cotton-Cultivators, of which the following is a specification, reference being had to the accompanying drawings.

This invention relates to improvements in devices for cultivating cotton and other crops and more particularly to a side harrow in the form of an attachment which may be applied to the beam of a cotton scraper and used in place of the scraper blade.

The object of the invention is to provide a simple and practical device of this character which may be readily applied to the beam of a cotton scraper to convert the same into an effective side harrow, thereby enabling a single beam and pair of handles to be used either with the scraper or with the harrow.

With the above and other objects in view, the invention consists of the novel features of construction and the combination and arrangement of parts hereinafter fully described and claimed, and illustrated in the accompanying drawings, in which—

Figure 1 is a perspective view of the invention; Fig. 2 is a vertical longitudinal section through the beam; Fig. 3 is a bottom perspective view of the harrow tooth bar; and Fig. 4 is a similar view of the attaching plate.

In the drawings 1 denotes a beam having suitably secured to it at its rear end a pair of upwardly diverging and connected handle bars 2.

3 denotes a harrow tooth bar secured by means of an attaching plate 4 to the bottom of the rear portion of the beam 1. The bar 3 is of rectangular shape and has arranged in it a plurality of harrow teeth or shovels 5 which may be of any desired form and construction. The bar 3 is disposed diagonally with respect to the beam 1 and is adapted to fit in a diagonally arranged socket formed centrally on the plate 4 by means of two diagonally arranged parallel ribs 6 between which latter said bar fits. The bar 3 is retained in said socket by providing the central harrow tooth or shovel 7 with a screw threaded stem 8 which extends through a central opening 9 in the bar 3 and is screwed into a threaded opening 10 in the center of the plate 4, as clearly shown in Fig. 2. A clamping nut 11 is arranged on the threaded stem or shank of the tooth 7 to bear against the bottom face of the bar 3 to retain the latter between the ribs or flanges 6. The attaching plate 4 extends longitudinally of the beam and in its end portions are openings 12 to receive bolts 13 by means of which latter it is removably secured to the beam 1.

While the cotton cultivator may be made complete, as shown in Fig. 1, we preferably construct the tooth bar 3 and attaching plate 4 so that they may be substituted for the usual scraper blade on the beam of an ordinary cotton scraper, thereby permitting such beam and its attached handles to be used in connection with both implements and saving the farmer the expense of having separate beams and handles for the two implements. The bolts 13 are used to connect either the scraper blade or the attaching plate of my improved side harrow device to the ordinary beam 1.

Having thus described the invention what is claimed is:

The herein described cotton cultivator comprising a beam, handles projecting upwardly and rearwardly from the rear end thereof, an attaching plate arranged longitudinally on the bottom of the rear portion of said beam and apertured adjacent its ends, the central portion of said plate being formed with a threaded opening, and with two depending diagonally arranged parallel ribs, the latter forming a socket, vertical bolts passed through the beams and the apertures in said plate, a diagonally disposed bar having its central portion arranged in said socket and formed with a vertical opening cultivator teeth depending from the end portions of said bar, a centrally arranged cultivator tooth having a threaded upper end passed through the opening in the bar and screwed into the threaded central opening in said plate, and a nut arranged on the threaded portion of the central tooth and bearing against the bottom face of said bar.

In testimony whereof we hereunto affix our signatures in the presence of two witnesses.

WILLIAM W. ROSS.
HARRY L. ROSS.

Witnesses:
A. C. MALONE,
J. D. ROBERTS.